June 26, 1973  J. R. DAFLER ET AL  3,741,810
BATTERY CONSTRUCTION
Filed July 6, 1971  2 Sheets-Sheet 1
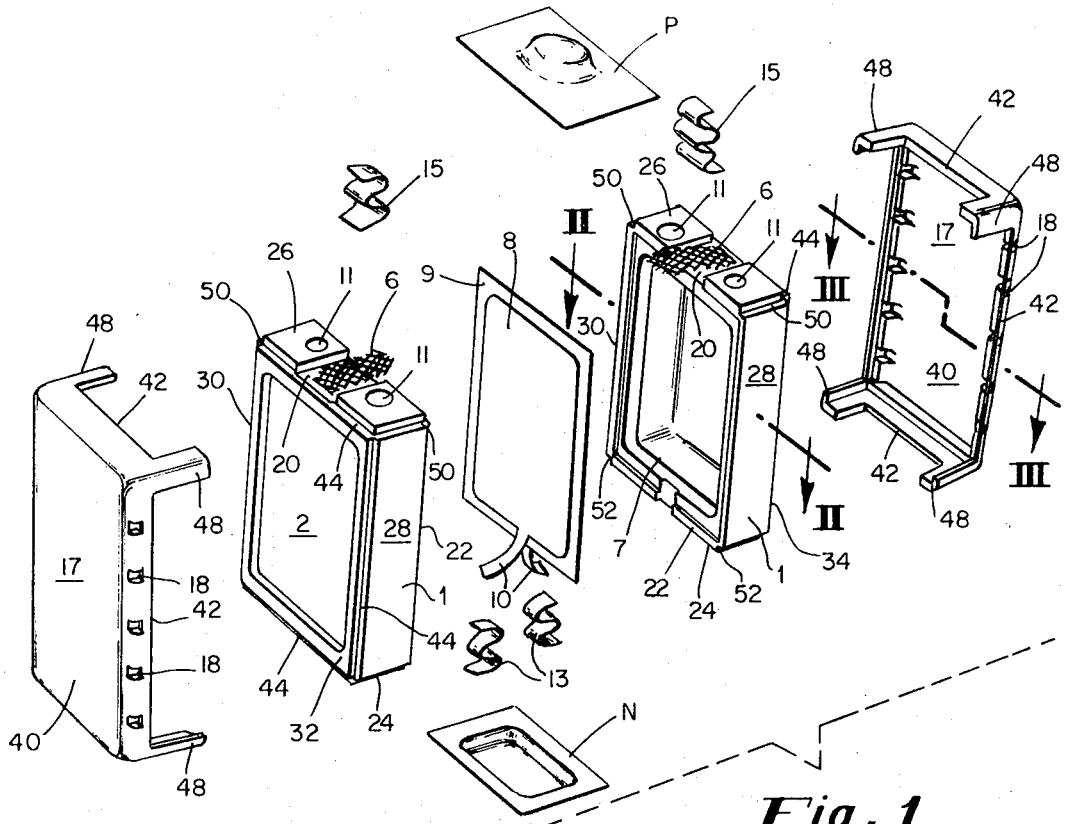
Fig. 1
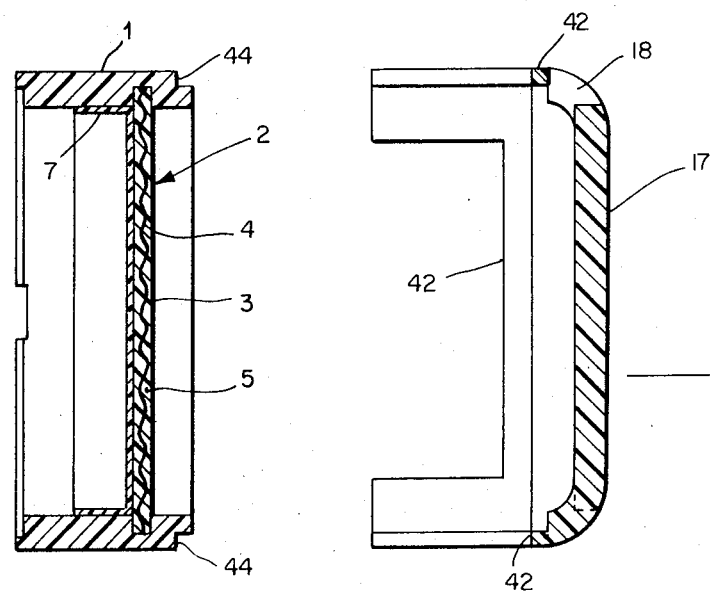
Fig. 2
Fig. 3
INVENTORS.
JAMES R. DAFLER
RICHARD P. NIEDERBERGER June 26, 1973     J. R. DAFLER ET AL     3,741,810
BATTERY CONSTRUCTION
Filed July 6, 1971                           2 Sheets-Sheet 2
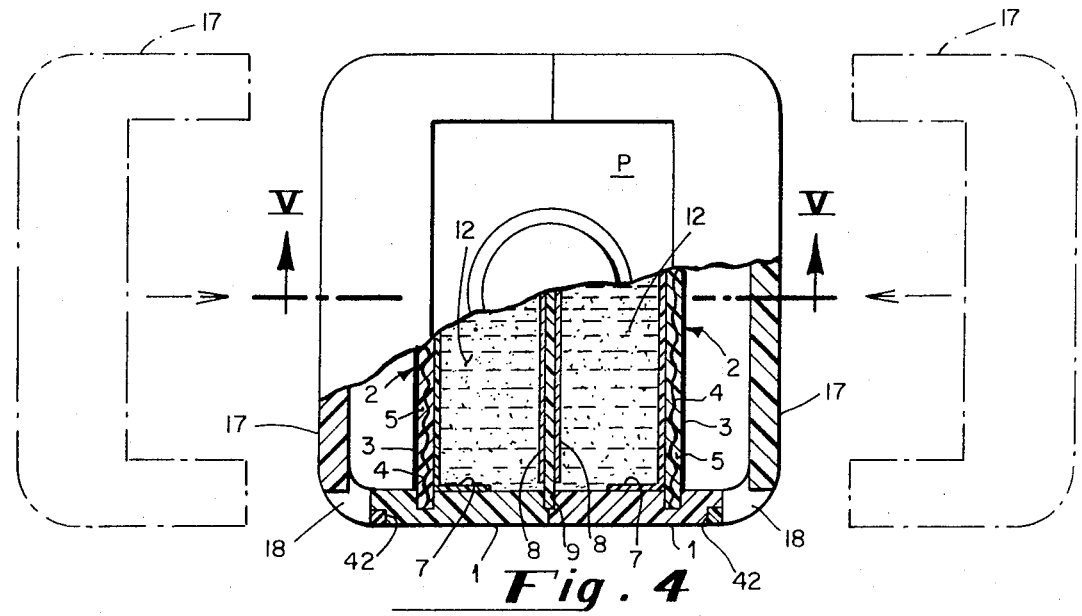
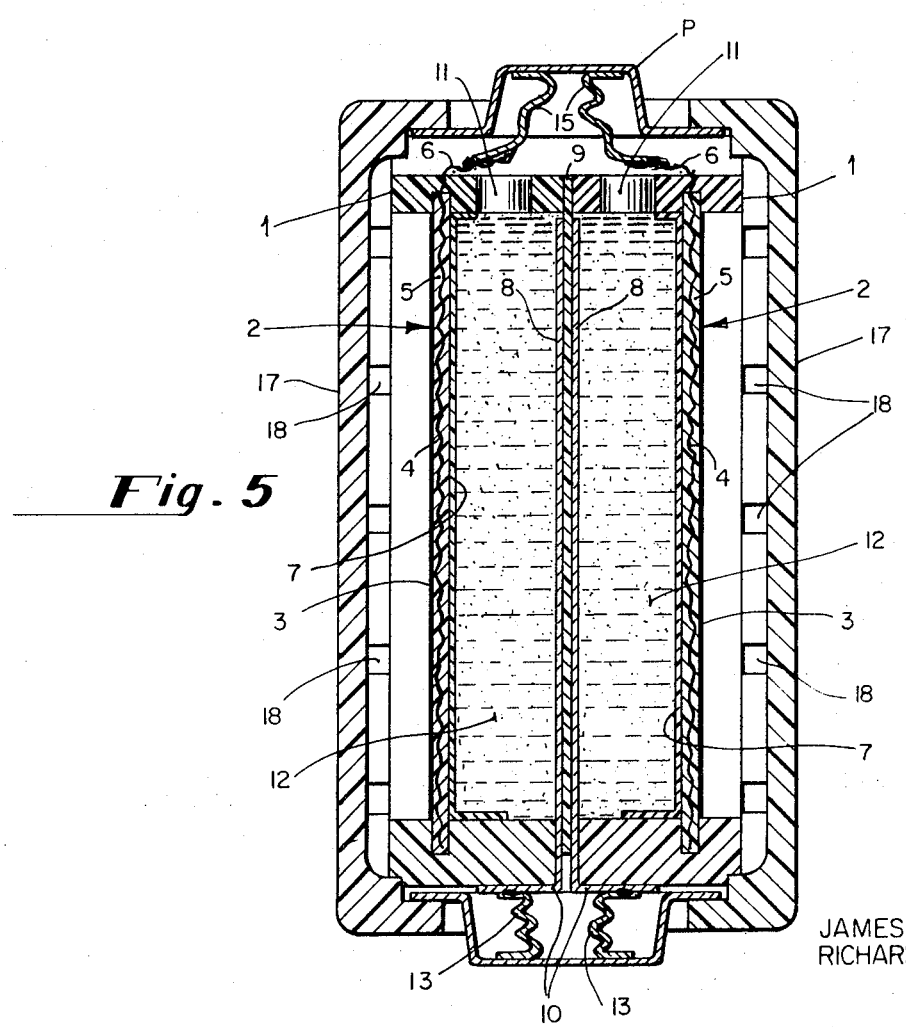
INVENTORS.
JAMES R. DAFLER
RICHARD P. NIEDERBERGER United States Patent Office 3,741,810
Patented June 26, 1973

3,741,810
BATTERY CONSTRUCTION
James R. Dafler, Yardley, and Richard P. Niederberger, Pineville, Pa., assignors to ESB Incorporated
Filed July 6, 1971, Ser. No. 159,815
Int. Cl. H01m 27/00
U.S. Cl. 136—86 A
7 Claims

ABSTRACT OF THE DISCLOSURE

An air depolarizable galvanic battery construction is disclosed. The battery includes a vessel structure having a portion thereof comprised of at least one air electrode. A closure means overlies the air electrode for preventing direct contact of foreign objects with the air electrode to thereby protect the air electrode from being damaged. The closure means is provided with air access openings and is disposed in spaced relation to the air electrode to permit circulation of air between it and the air electrode.

BACKGROUND OF THE INVENTION

Field of the invention

This invention relates to a battery construction for galvanic cells that are depolarized by atmospheric oxygen.

Description of the prior art

It may be explained that the mode of operation of air-depolarized cells or batteries of the type here contemplated are well known, as for example, see the United States patents to Schumacher et al. (2,597,119 and 3,644,024), the United States patent to Marsal (2,816,152), and the United States patent to Katsoulis (3,533,845).

It may further be explained that throughout the history of the battery art, the packaging or the assemblying of the various materials forming a battery have presented unique problems. Basically, these problems may be characterized as constructional problems which arise with regard to internal as well as external constructional details. In part, the internal constructional details, deal with the manner in which the active materials which form the electrodes are supported within the cell or battery. Again, in part, the external constructional details deal with the container or vessel used to house the electrodes and the requisite electrolyte that must be present in all batteries. An essential characteristic of the container or vessel is that it be substantially leakproof. Accordingly, what was sought in a battery construction was one that was inexpensive, easily fabricated, mass produceable, served the intended function of housing the electrode materials and one that was essentially leakproof.

In addition to these just mentioned constructional problems which are present in so-called conventional batteries, air-depolarizable batteries present additional constructional problems. These latter batteries are unique and differ from conventional batteries in that they have a so-called "breathing electrode" or "air electrode" that must have access to atmospheric oxygen. The necessity of access to atmospheric oxygen, has generally required that the air electrode be exposed or open to the atmosphere. This, however, meant that the air electrode would also be exposed to direct contact by foreign objects which could easily damage them.

SUMMARY OF THE INVENTION

Conceptionally, the present invention deals with both the internal and external constructional requirements of air depolarizable batteries simultaneously to provide a battery construction wherein the supporting structure, i.e., the vessel for the internal active materials including the electrodes and the electrolyte, cooperates with the closure means which prevent direct contact of foreign objects with the air electrode or air electrodes of the battery. The supporting structure or vessel together with the closure means form the total packaging of the battery of the invention.

Briefly and in accordance with the invention, an air depolarizable galvanic cell is provided. The galvanic cell has a pair of terminals electrically connected to the active materials of the cell. A closure means is provided which overlies the air electrode of the cell for preventing direct contact of foreign objects with the air electrode to thereby protect the air electrode from being damaged. The closure means is disposed in spaced relation to the air electrode to permit circulation of air between closure means and the air electrode. The closure means is adapted to secure at least one of the terminals of the cell to the cell.

Also, the closure means is dimensioned to have its peripheral portion extend beyond the peripheral portion of the air electrode. The peripheral portion of the closure means has at least one air access opening therein to allow air to enter into the space between the closure means and the air electrode. The entry angle of the air access opening is selected to prevent damage to the air electrode in the event of penetration of the opening by a foreign object. The position of the opening is selected to permit stacked or side by side relation of similar galvanic cells without blocking entry of air via the opening into the space between the closure means and the air electrode.

As will be further understood hereinafter, the present invention results in a battery construction that is inexpensive, easily fabricated, mass produceable, serves the intended function of housing the electrode materials and is essentially leakproof.

A more complete understanding of the invention will become apparent from the following description, taken in conjunction with the accompanying drawings showing only a preferred embodiment of the invention.

BRIEF DESCRIPTION OF THE DRAWINGS

FIG. 1 is an exploded perspective view of an air depolarizable battery in accordance with the invention;

FIG. 2 is a cross-sectional view of a portion of the battery of FIG. 1 taken along the lines II—II of FIG. 1;

FIG. 3 is a cross-sectional view of one of the closure panels of FIG. 1 taken along the lines III—III of FIG. 1;

FIG. 4 is a top view of and partial section of the assembled battery of FIG. 1; and, FIG. 5 is a cross-sectional side view of the assembled battery of FIG. 1 taken along the lines V—V of FIG. 4.

DESCRIPTION OF THE PREFERRED EMBODIMENTS

It may be pointed out here that all references to air depolarizable, atmospheric oxygen, etc. both above and hereinbelow are meant to include all of the concepts included in the terms metal/air and metal/oxygen cells. Also, while specific reference to particular anode and cathode materials and other materials for the various parts of the battery will be made, any other suitable materials may be employed. Further, while a specific bicell construction is utilized to illustrate the invention, it is to be understood that other arrangements and designs utilizing the concepts of the invention may be employed. As for example, a single cell may be fabricated in accordance with the teachings of the invention as well as multiple cell arrangements wherein a plurality of air electrodes are employed.

Referring now to the drawings, wherein like reference numerals refer to like parts throughout the several views, there is illustrated a pair of rectangular frames 1. The frames 1 are formed in a mold utilizing an electrically non-conductive material, as for example, a polymer. Each of the frames 1 is formed with an air electrode 2 embedded therein. The preferred air electrodes are prepared according to copending application Ser. No. 859,221 to David P. Boden et al. filed July 14, 1969. As best seen in FIGS. 2, 4 and 5, these air electrodes have one surface 3 of a microporous fluorocarbon polymer film which is directly exposed to atmospheric oxygen during cell discharge. On the interior surface of the air electrodes 2 is a nickel screen 4 onto which is pressed a porous, wet proofed catalyst composition 5 comprising carbon and a wet-proof polymer. Typically the size (one side) of the air electrodes 2 is about 12.6 cm.$^2$. A 5 mil thick copper foil strip 6, which acts as the current collector for the positive terminal P, is attached to the nickel screen 4/carbon 5 surface.

A separator in the form of a coating 7 is provided on each air electrode 2. The preferred separator coating 7 is prepared according to copending application Ser. No. 126,103 to John J. Kelley et al. filed Mar. 19, 1971. In accordance with the teachings of this latter application, the separator is prepared as a solution of 4 grams of a high molecular weight polyacrylic acid in a liter of de-ionized water. The solution is placed in a desiccator under 20 to 30 inches vacuum until the mass is bubble-free. The solution is gelatinous and thixotropic. A charge of the separator gel is applied in the crevices provided by the frames 1 on the carbon side of the air electrodes 2. The solution is allowed to air dry for one to two days, is stable for long periods of time after a smooth skin forms on the coating 7 and a major portion of the water has evaporated. After drying, the typical film is 2 mg./cm.$^2$ with a thickness of less than one mil.

A multicell or bicell assembly is prepared by joining, as by solvent cementing, the two frames 1 together with copper current collectors 8 sandwiching a sheet of thermoplastic 9. These copper strips act as the current collector for the negative electrode and are bent, as at 10, around the frames 1 (FIG. 5). A negative metal electrode gel 12 is injected through holes 11 provided in the frames 1 and into the cells with a syringe. A second set of holes 11 are provided for air displacement. The negative electrode gel comprises finely divided zinc powder and polyacrylic acid in a potassium hydroxide solution. The cavity of each cell is filled with sufficient negative gel mix 12 to yield a theoretical desired capacity in terms of ampere hours. After filling, all of the holes 11 are plugged with an epoxy sealing compound.

Springs 13 and the negative terminal end cap of plate N are held against the negative current collector 10, and springs 15 and positive terminal end cap or plate P are held against the positive current collectors 16, by means of the electrically non-conductive plastic end closure panels 17 which are fitted over the terminal plates holding them in pressure contact with the current collectors. The end closures 17 are attached to the respective frames 1, as by solvent cementing, to provide a finished battery construction. The end closures 17 have openings 18 to provide a continuous flow of air to the air electrodes 2.

As will be understood from the foregoing, the frames 1 are complemental and when joined together form a leakproof multicell vessel structure or assembly as shown in FIGS. 1, 4 and 5. The assembled vessel structure is substantially of rectangular prismatic configuration having substantially flat planar outer surfaces except for the shown recessed portions 20 which are provided for the foil strips 6. The assembled vesesl structure can be visualized by the reader by mentally joining the two frames 1 of FIG. 1 along the confronting marginal faces 22 of the frames 1. The assembled vessel structure thus has a bottom wall 24, a top wall 26, and a pair of opposite walls 28, 30 and a pair of opposite end walls 32, 34. A portion of each of the end walls 32, 34 is comprised of the air electrodes 2.

The end closure panels 17 essentially comprise closure end panels joined to the opposite end walls 32, 34. Each of the closure end panels 17 substantially conforms in size to the opposite end walls 32, 34 of the vessel structure, and each comprises a substantially flat rectangular planar surface 40 having peripheral edge portions 42 of reduced thickness. The edge portions 42 of the closure end pannels 17 are curved and extend inwardly and engage complemental peripheral edge portions 44 of the top, bottom and end walls of the assembled vessel structure. Each of the end panels 17 has an inwardly extending leg portion 48 at each of its corners, which leg portions are complementary in configuration to the top and bottom edge portions 50 and 52, respectively, of the side walls 28 and 30 of the assembled vessel structure.

The curved peripheral edge portions of each end panel 17 is the preferred loction for the air access openings 18, however, they may be provided along the top and bottom edge portions of the panels, if desired. The entry angle of the openings 18 is such that it would be difficult for a foreign object to pass through them and make contact with the air electrodes 2, thus, protecting the air electrode against damage. The positioning of the openings 18 along the curved portions of the closure end panels 17 permits stacked or side by side relation of like batteries without blocking entry of air into the space between the closure end panels 17 and the air electrodes 2.

With the closure end panels 17 joined to vessel structure, the spacing of the end panels 17 is such so as to provide a substantially square prismatic configuration to the battery. Also, the corner legs 48 of each of the end panels are arranged such that the positive terminal plate P, located at the top of the cell assembly, is secured in position by the cooperative action of the top leg portions of each of the end panels 17 and the negative terminal plate N, located at the bottom of the cell assembly, is secured in position by the cooperative action of the bottom leg portions of each of the end panels 17.

Having thus described our invention, we claim:

1. An air depolarizable galvanic cell comprising an electrolyte, an anode, an air depolarizable cathode and a separator therebetween, a pair of terminals with means electrically connecting one of said terminals to the anode and means electrically connecting the other terminal to the cathode, and a pair of plastic end closure panels overlaying and spaced from the air depolarizable cathode and fitted over the terminals to hold them in contact with the electrical connection means, said end closure panels providing the cell with a generally prismatic shape and having curved peripheral edge portions containing air access openings which prevent the blockage of air entry into the space between the air cathode and the plastic closure panels when a plurality of cells are stacked or placed in side-by-side relation.

2. A cell in accordance with claim 1 in which the air depolarizable cathode comprises two air electrodes embedded in plastic frames and electrically connected to form the air depolarizable cathode, each of said frames being in contact with the plastic closure panels overlaying the respective air electrodes so as to form a space between the air electrode and the closure panel.

3. A cell in accordance with claim 1 in which the means electrically connecting the terminals with the anode and cathode comprise metallic spring means which are held in pressure contact with the terminals by the plastic closure panels.

4. An air depolarizable galvanic battery comprising a multicell assembly in which each cell has an electrolyte, an anode, an air depolarizable cathode and a separator therebetween, said battery having a pair of terminals with means electrically connecting one of said terminals to an anode and means electrically connecting the other terminal to a cathode, and a pair of plastic end closure panels overlaying and spaced from the end walls of the end cells which comprise an air electrode, said plastic end closure panels fitted over the terminals to hold them in contact with the electrical connection means, said end closure panels providing the battery with a generally prismatic shape and having curved peripheral edge portions containing air access openings which prevent the blockage of air entry into the space between the air electrode and the end closure panel when a plurality of batteries are stacked or placed in side-by-side relation.

5. A battery in accordance with claim 4 in which the means electrically connecting the terminals with the anode and cathode comprise metallic spring means which are held in pressure contact with the terminals by the plastic closure panels.

6. A battery in accordance with claim 4 in which the air depolarizable cathodes comprise an air electrode embedded in a plastic frame which spaces the air electrode embedded therein from the end closure panel.

7. A battery in accordance with claim 4 in which each plastic end closure panel has four leg portions extending from its corners and overlaying the top and bottom edge portions of the battery, said leg portions of one end panel extending inwardly so as to be in contact with the corresponding leg portions of the other end panel.

References Cited
UNITED STATES PATENTS

| | | | |
|---|---|---|---|
| 2,797,254 | 6/1957 | Schumacher et al. | 136—136 |
| 2,991,412 | 7/1961 | Kordesch | 136—136 |
| 3,133,837 | 5/1964 | Eidensohn | 136—86 |
| 3,332,802 | 7/1967 | Clune et al. | 136—166 |
| 3,436,270 | 4/1969 | Oswin et al. | 136—86 A |

WINSTON A. DOUGLAS, Primary Examiner

H. A. FEELEY, Assistant Examiner